(12) United States Patent  
Hijikata

(10) Patent No.: US 7,078,086 B2  
(45) Date of Patent: *Jul. 18, 2006

(54) HONEYCOMB STRUCTURE AND ASSEMBLY THEREOF

(75) Inventor: Toshihiko Hijikata, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 115 days.

This patent is subject to a terminal disclaimer.

(21) Appl. No.: 10/469,380

(22) PCT Filed: Mar. 7, 2002

(86) PCT No.: PCT/JP02/02106

§ 371 (c)(1),  
(2), (4) Date: Aug. 29, 2003

(87) PCT Pub. No.: WO02/079617

PCT Pub. Date: Oct. 10, 2002

(65) Prior Publication Data

US 2004/0096625 A1     May 20, 2004

(30) Foreign Application Priority Data

Mar. 29, 2001   (JP)   ............................... 2001-95014

(51) Int. Cl.  
*B32B 3/12*     (2006.01)  
*B01J 21/04*    (2006.01)

(52) U.S. Cl. ...................... 428/116; 422/177; 422/179; 422/180; 502/439

(58) Field of Classification Search ................ 428/116; 522/490, 493, 523; 422/177, 178, 179, 180, 422/181; 502/439  
See application file for complete search history.

(56) References Cited

U.S. PATENT DOCUMENTS

| 5,724,735 A | | 3/1998 | Ickes et al. |
| 5,782,089 A | * | 7/1998 | Machida et al. ............... 60/299 |
| 5,866,079 A | * | 2/1999 | Machida et al. ............ 422/179 |

FOREIGN PATENT DOCUMENTS

EP           0 361 883 A1     4/1990

(Continued)

OTHER PUBLICATIONS

Suresh T. Gulati, Corning Glass Works Corning, NY, SAE Article 860008, "Strength and Thermal Shock Resistance of Segmented Wall-Flow Diesel Filters", pp. 11-18.

*Primary Examiner*—Jennifer McNeil  
*Assistant Examiner*—Timothy M. Speer  
(74) *Attorney, Agent, or Firm*—Oliff & Berridge, PLC

(57) ABSTRACT

A honeycomb structure obtained by bonding, into one piece, a plurality of honeycomb segments (2) each having a plurality of passages (6) surrounded by cell walls and extending in the axial direction of the segment. In the honeycomb structure, a material A (3) having compressive elasticity is provided at least at a portion of the gaps formed by each two faces of adjacent honeycomb segments (2). A honeycomb structure assembly (8) obtained by providing a material B (5) having compressive elasticity on the outer peripheral portion of the above honeycomb structure in a compressed state and thereby compression-holding the honeycomb structure in a metallic container (11). The honeycomb structure and the honeycomb structure assembly have good durability and resistance to heat or vibration, applied during their use.

17 Claims, 7 Drawing Sheets

FOREIGN PATENT DOCUMENTS

| | | |
|---|---|---|
| EP | 0 639 702 A1 | 2/1995 |
| EP | 0 643 204 A2 | 3/1995 |
| JP | A 55-46338 | 4/1980 |
| JP | B2 61-51240 | 11/1986 |
| JP | U 1-63715 | 4/1989 |
| JP | U 6-47620 | 6/1994 |
| JP | A 08-28246 | 1/1996 |
| JP | B2 8-13706 | 2/1996 |
| JP | A 9-220480 | 8/1997 |
| JP | A 2000-210517 | 8/2000 |
| JP | 2000-279728 | * 10/2000 |
| JP | A 2000-279729 | 10/2000 |
| JP | A 2002-60279 | 2/2002 |
| WO | WO 94/16134 | 7/1994 |
| WO | WO 00/00702 | 1/2000 |

* cited by examiner

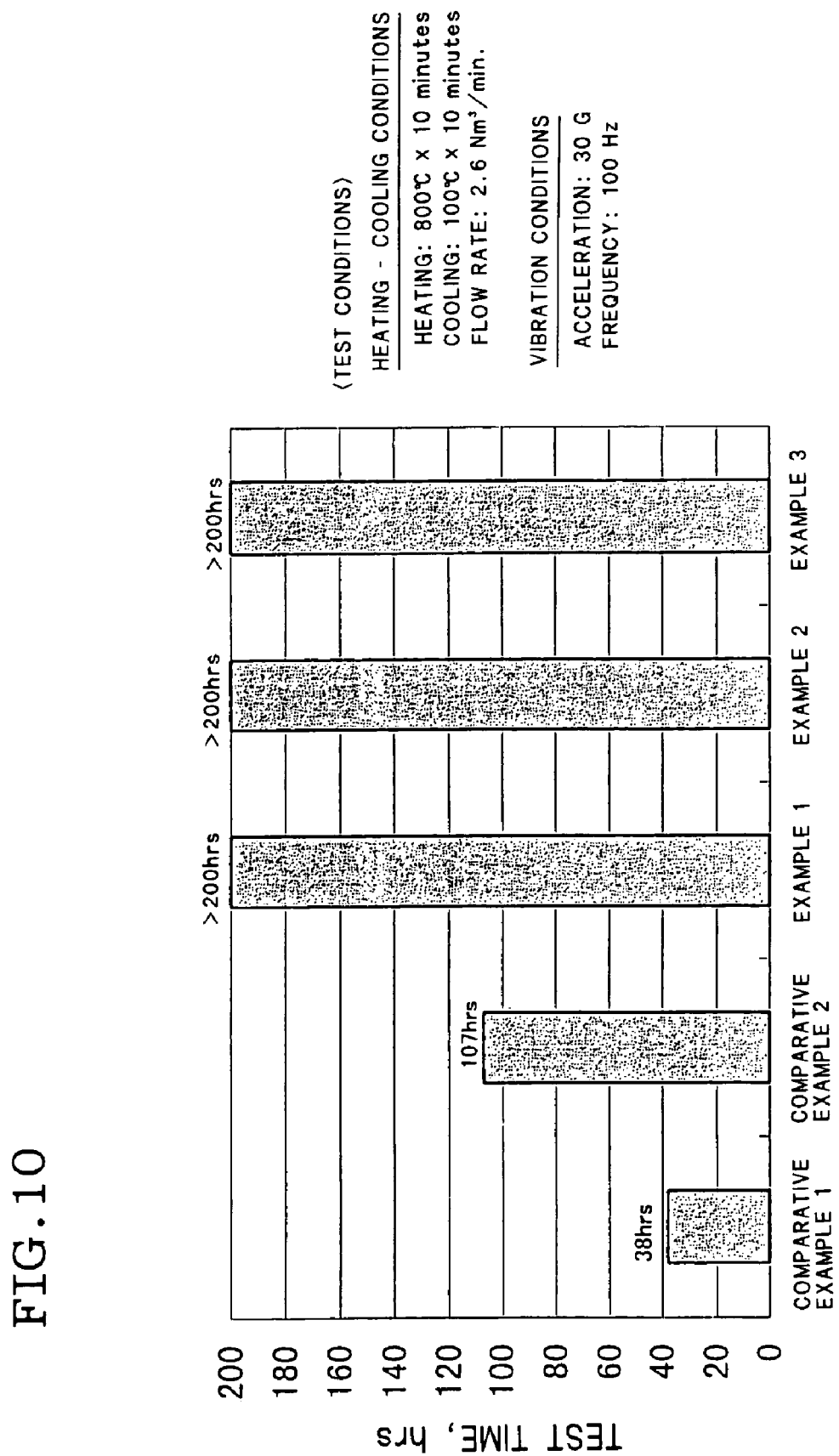

HONEYCOMB STRUCTURE AND ASSEMBLY THEREOF

BACKGROUND

The present invention relates to a honeycomb structure used in, for example, a carrier for a catalyst having a catalytic action, for use in an internal combustion engine, a boiler, a chemical reactor, a fuel cell reformer, etc., and to a filter for trapping fine particles present in an exhaust, and to an assembly thereof. More particularly, the present invention relates to a honeycomb structure that resists breaks when exposed to vibration or thermal stress during use, and to an assembly thereof.

Honeycomb structures are in use in, for example, a carrier for a catalyst having a catalytic action, for use in an internal combustion engine, a boiler, a chemical reactor, a fuel cell reformer, etc., and to a filter for trapping fine particles present in an exhaust gas, particularly fine particles emitted from a diesel engine.

In a honeycomb structure used for such a purpose, a sharp temperature change of exhaust gas and local heating makes non-uniform a temperature distribution inside the honeycomb structure, and there have been problems, such as crack generation, in the honeycomb structure and the like. When the honeycomb structure is used particularly as a filter for trapping a particulate substance in an exhaust gas emitted from a diesel engine, it is necessary to burn fine carbon particles deposited on the filter to remove the particles and regenerate the filter and, in that case, high temperatures are inevitably generated locally in the filter; as a result, a large thermal stress and cracks have tended to generate.

Hence, processes have been proposed for producing a honeycomb structure by bonding a plurality of individual honeycomb segments together using an adhesive. For example, U.S. Pat. No. 4,335,783 discloses a process for producing a honeycomb structure that comprises bonding a plurality of honeycomb parts using a discontinuous adhesive. Also, JP-B-61-51240 proposes a thermal shock-resistant rotary regenerating heat exchanging method that comprises (1) forming, by extrusion, matrix segments of honeycomb structure made of a ceramic material, (2) firing them, (3) making smooth, by processing, the outer peripheral portions of the fired segments, (4) coating the to-be-bonded areas of the resulting segments with a ceramic adhesive having, when fired, substantially the same chemical composition as the matrix segments and showing a difference in thermal expansion coefficient of 0.1% or less at 800° C., and firing the coated segments. Also, SAE article 860008 of 1986 discloses a ceramic honeycomb structure obtained by bonding cordierite honeycomb segments with a cordierite cement. Further JP-A-8-28246 discloses a ceramic honeycomb structure obtained by bonding honeycomb ceramic members with an elastic sealant made of at least a three-dimensionally intertwined inorganic fiber, an inorganic binder, an organic binder and inorganic particles.

Meanwhile, regulations for exhaust gas have become stricter, and engines have come to have higher performances. As a result, in order to achieve improvement in combustion conditions of an engine and an increase in the purification ability of a catalyst, the temperature of the exhaust gas has increased year by year. In this connection, a higher thermal shock resistance and a higher vibration resistance have come to be required for the honeycomb substrate. Therefore, even with honeycomb structures such as mentioned above, when the vibration, heat, exhaust gas pressure, etc., applied thereto during use becomes larger, it is possible that cracks, etc., will appear in the adhesive used therein or areas bonded therewith and, in an extreme case, there may occur, for example, disintegration of the honeycomb structure and breakage of the structure into fine pieces caused by vibration.

The present invention has been made in view of the above situation. It aims at providing a honeycomb structure having improved durability and resistance to damage caused by vibration, heat, exhaust gas pressure, etc., applied during use, and to the assembly thereof.

SUMMARY

The present invention provides a honeycomb structure obtained by bonding, into one piece, a plurality of honeycomb segments each having a large number of passages surrounded by cell walls and extending in the axial direction of the segment, characterized in that a material A having compressive elasticity is provided at least at a portion of the gaps formed by each two faces of adjacent honeycomb segments, close to each other.

In the present invention, it is preferable that the material A having compressive elasticity is a ceramic fiber-made mat, and it is further preferable that the ceramic fiber-made mat is a non-intumescent mat composed mainly of alumina or mullite. It is also preferable that the honeycomb structure of the present invention is used for purification of exhaust gas of an automobile, and it is further preferable that the honeycomb structure is used as a filter for trapping diesel fine particles. In the present invention, it is also preferable that the main component of the honeycomb segment comprises (1) at least one kind of ceramic selected from the group consisting of silicon carbide, silicon nitride, cordierite, alumina, mullite, zirconia, zirconium phosphate, aluminum titanate, titania, and combinations thereof, and (2) Fe—Cr—Al, nickel or metallic Si and SiC.

In another aspect, the present invention provides a honeycomb structure assembly obtained by providing a material B having compressive elasticity, on the outer peripheral portion of the above honeycomb structure in a compressed state and thereby compression-holding the honeycomb structure in a metallic container.

In this aspect of the present invention, the material B having compressive elasticity is preferably a ceramic fiber-made mat, further preferably a heat-intumescent mat containing vermiculite, more preferably a non-intumescent mat composed mainly of alumina or mullite. The honeycomb structure assembly is preferably a canned structure obtained by a stuffing method, a tourniquet method, a clamshell method or a swaging method. Further, the honeycomb structure assembly is preferably obtained by loading a catalyst on honeycomb segments and then accommodating the catalyst-loaded honeycomb segments in a metallic container. Also, the honeycomb structure assembly is preferably obtained by accommodating honeycomb segments in a metallic container and then loading a catalyst on the honeycomb segments.

BRIEF DESCRIPTION OF THE DRAWINGS

FIG. 8(a) shows the honeycomb structure of an Example 1; FIG. 8(b) shows the honeycomb structure of Example 2; and FIG. 8(c) shows the honeycomb structure of Example 3.

FIG. 9(a) shows the honeycomb structure of Comparative Example 1; and FIG. 9(b) shows the honeycomb structure of Comparative Example 2.

FIG. 10 is a graph showing the result of a hot vibration test.

DETAILED DESCRIPTION OF EMBODIMENTS

The honeycomb structure and honeycomb structure assembly of the present invention are described in detail below with reference to the accompanying drawings. However, the present invention is not restricted to the following mode. Incidentally, in the following, "section" refers to a section vertical to the direction of passage unless otherwise specified.

Figure 1:
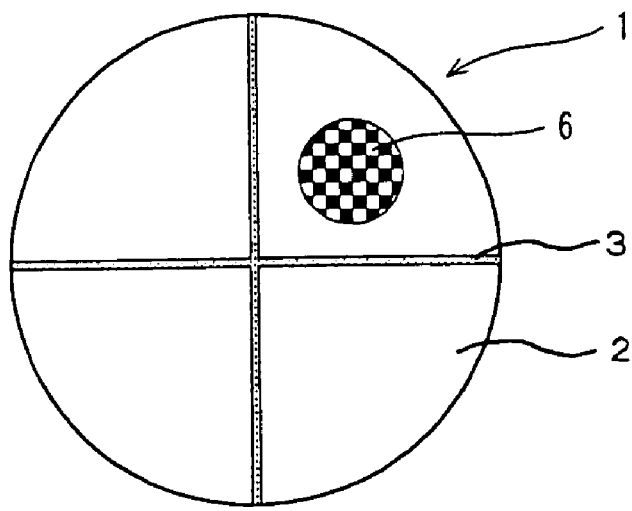
FIG. 1 is a schematic top view showing one embodiment of the honeycomb structure of the present invention.

FIG. 1 is a schematic top view showing one embodiment of the honeycomb structure of the present invention. The honeycomb structure 1 of the present invention shown in FIG. 1 is constituted by providing, as a material A having compressive elasticity, a ceramic fiber-made mat 3 at the gaps formed by each two close faces of two adjacent honeycomb segments 2 each having a large number of passages 6 surrounded by cell walls and extending in the axial direction of the segment.

The characteristic constitution of the present invention is that a material A having compressive elasticity is provided at least at a portion of the gaps formed by each two faces of adjacent honeycomb segments 2, close to each other. Employing such a constitution, the honeycomb structure of the present invention is improved in durability and resistance to vibration, heat, exhaust gas pressure, etc., applied during use. In the present invention, "providing a material A having compressive elasticity at least at a portion of the gaps formed by each two close faces" means that it is sufficient to provide the material A having compressive elasticity at a portion of part of the gaps formed by each two close faces. However, it is preferred that the material A having compressive elasticity is provided at the whole portion of part of the gaps or at a portion of the gaps, and it is further preferred that the material A having compressive elasticity is provided at the whole portion of the gaps.

In the present invention, the material A having compressive elasticity is preferred to have heat resistance and cushioning. As the compressive elasticity material A having heat resistance and cushioning, there is a non-intumescent material containing substantially no vermiculite or a low-intumescent material containing a small amount of vermiculite. Such a material is preferred to contain, as a main component, a ceramic fiber made of at least one kind selected from the group consisting of alumina, high alumina, mullite, silicon carbide, silicon nitride, zirconia and titania, or of a composite thereof. Of these, a non-intumescent material containing substantially no vermiculite and composed mainly of alumina or mullite is more preferred. Further, the material A having compressive elasticity is preferred to be a mat made of such a fiber, and the ceramic fiber-made mat is preferred to be a non-intumescent mat composed mainly of alumina or mullite. Further preferably, these ceramic-made mats have a sealing property for preventing the leakage of to-be-treated fluid. Preferred specific examples of the material A having compressive elasticity are 1100HT™ produced by 3M Co. and Maftec™ produced by Mitsubishi Chemical Corporation.

In the present invention, it is preferred that the material A having compressive elasticity is provided at the whole portion of the gaps formed by each two close faces of adjacent honeycomb segments 2. However, when the material A having compressive elasticity is provided only at selected gaps, an adhesive may be used for bonding, at other gaps not provided with the material A having compressive elasticity.

In the present invention, each honeycomb segment 2 is preferred to contain, as a main component, at least one kind of ceramic selected from the group consisting of (1) silicon carbide, silicon nitride, cordierite, alumina, mullite, zirconia, zirconium phosphate, aluminum titanate, titania and combinations thereof, and (2) Fe—Cr—Al, nickel, or metallic Si and SiC, from the standpoints of the strength, heat resistance, etc., of the honeycomb segment. In the present invention, "main component" means a substance which is 80% by mass or more of all components and which becomes a main crystalline phase.

The cell density of the honeycomb segment 2 is preferably 0.9 to 310 cells/cm$^2$ (6 to 2,000 cells/in.$^2$). When the cell density is less than 0.9 cell/cm$^2$, the geometric surface area is insufficient. When the cell density is more than 310 cells/cm$^2$, the pressure loss is too large. The sectional shape (cell shape) of the passage of the honeycomb segment 2 is preferably any of a triangle, a tetragon and a hexagon from the standpoint of production of honeycomb segments.

The section of the honeycomb segment 2 has at least one side of preferably 30 mm or more, more preferably 50 mm or more, most preferably 70 mm or more from the standpoint of providing the material A having compressive elasticity in production of the honeycomb segment.

Figure 2:
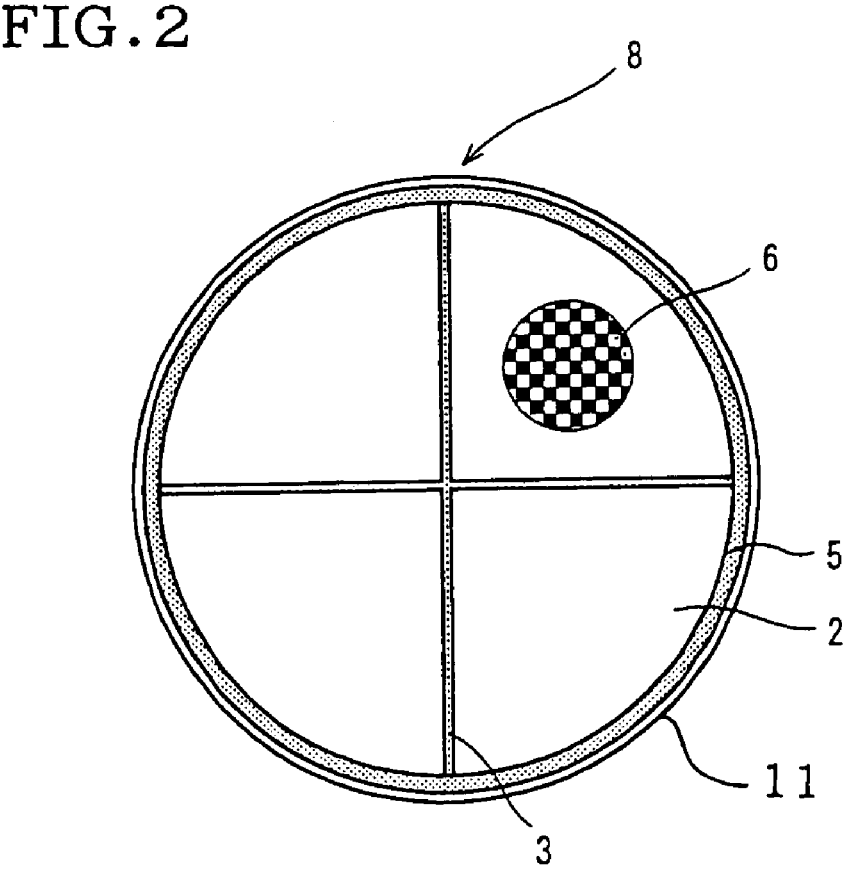
FIG. 2 is a schematic top view showing one embodiment of the honeycomb structure assembly of the present invention.

FIG. 2 is a schematic top view of a honeycomb structure assembly 8 obtained by holding a honeycomb structure shown in FIG. 1, in a metallic container 11. The honeycomb structure assembly 8 of the present invention, shown in FIG. 2, is obtained by providing a material B having compressive elasticity 5, on the outer peripheral portion of a honeycomb structure 1 in a compressed state and thereby compression-holding the honeycomb structure 1 in a metallic container 11.

In the present invention, the material B having compressive elasticity is preferred to have heat resistance and cushioning, similarly to the above-mentioned material A having compressive elasticity, and is further preferred to have sealing property. The material B having compressive elasticity 5 may be a non-intumescent material or an intumescent material. The material B having compressive elasticity 5 is preferred to be, for example, a ceramic fiber composed mainly of at least one kind selected from the group consisting of alumina, high alumina, mullite, silicon carbide, silicon nitride, zirconia and titania, or of a composite thereof, and is further preferred to be a mat made of such a fiber. Specifically, there can be used, for example, 1100HT™ produced by 3M Co. and Maftec™ produced by Mitsubishi Chemical Corporation, both mentioned above. There can also be used, for example, Interlam Mat™ produced by 3M Co. (an intumescent mat).

Figure 3:
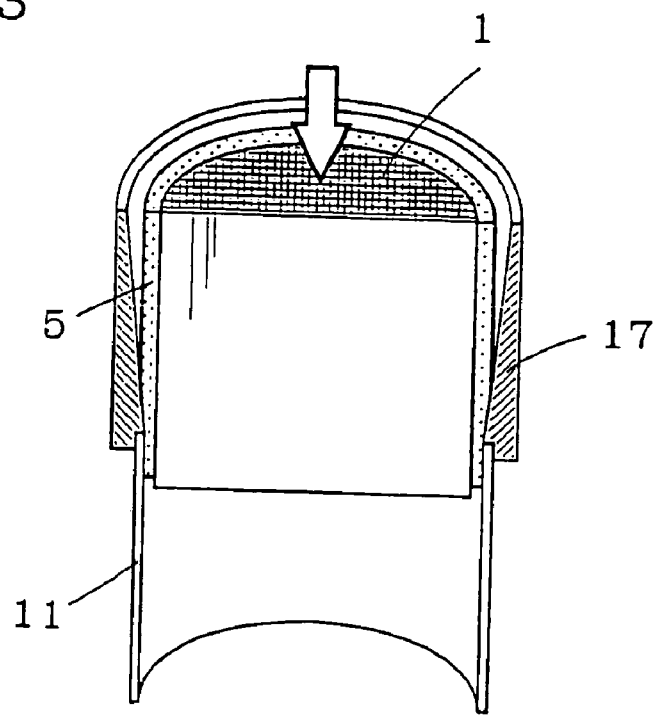
FIG. 3 is a partially cut-away view showing one example of the stuffing method used for stuffing a honeycomb structure in a metallic container.
Figure 4:
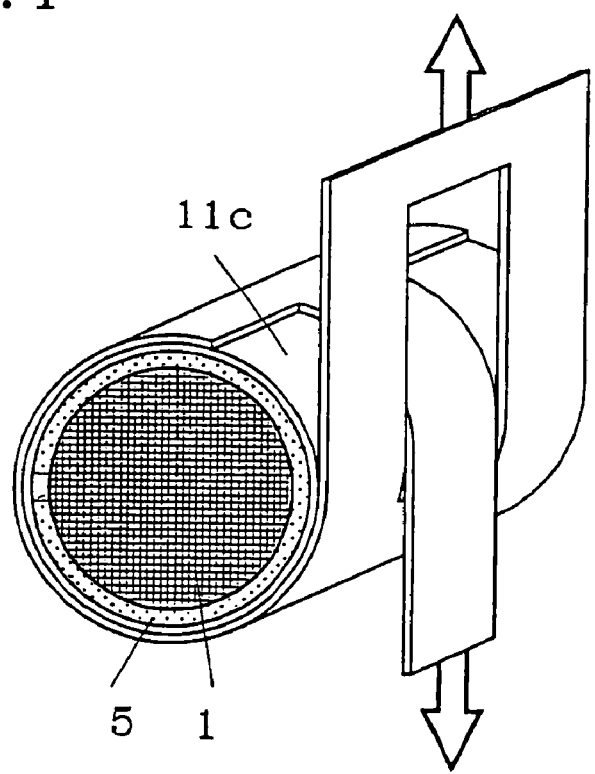
FIG. 4 is a perspective view showing one example of the tourniquet method used for accommodating a honeycomb structure in a metallic container.
Figure 5:
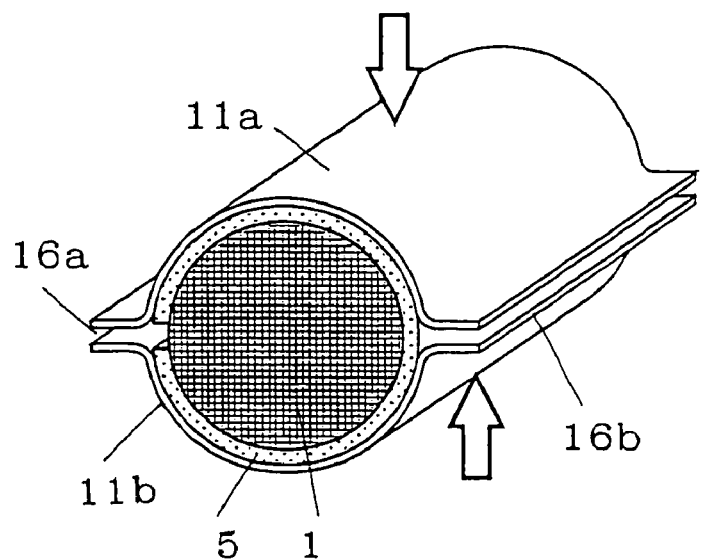
FIG. 5 is a perspective view showing one example of the clamshell method used for accommodating a honeycomb structure in a metallic container.
Figure 6:
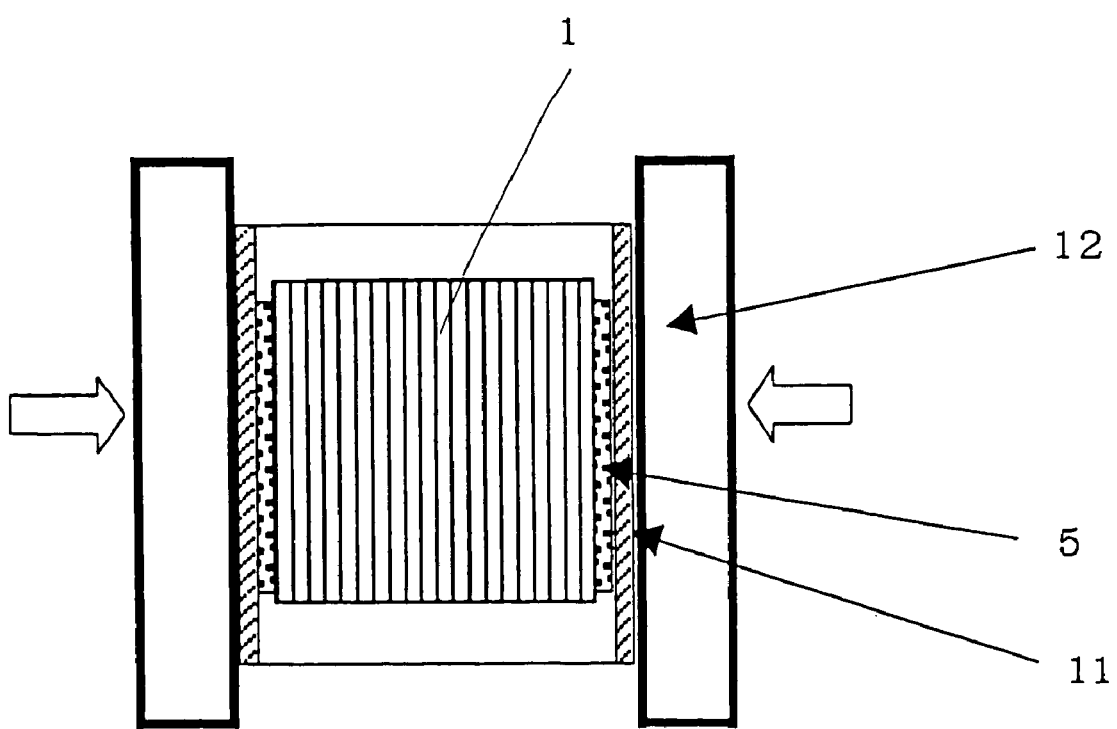
FIG. 6 is a sectional view parallel to the direction of passage, showing one example of the swaging method used for accommodating a honeycomb structure in a metallic container.
Figure 7:
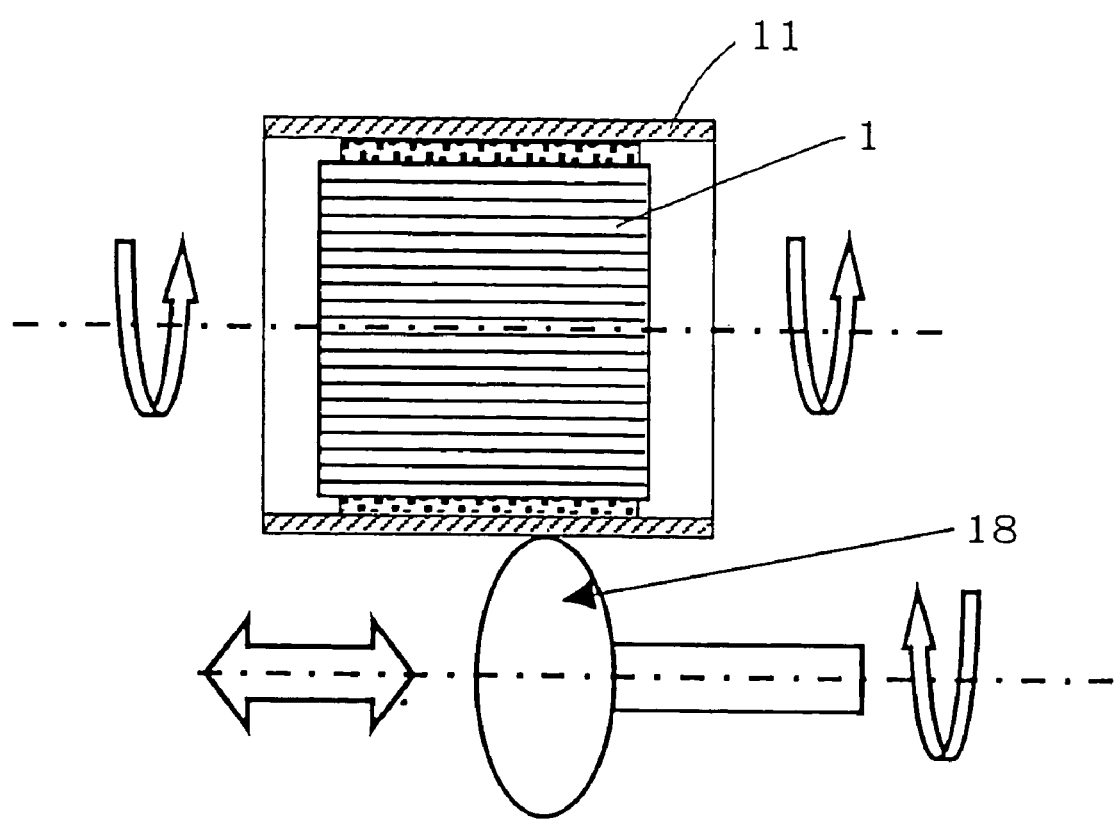
FIG. 7 is a sectional view parallel to the direction of passages, showing one example of the swaging method used for accommodating a honeycomb structure in a metallic container.

In the present invention, as the method for accommodating a honeycomb structure 1 and a material B having compressive elasticity 5 in a metallic container 11 in a compressed state, there are suitably used a stuffing method shown in FIG. 3, using a guide 17; a tourniquet method shown in FIG. 4, which comprises winding a metallic plate 11c round a honeycomb structure, pulling the plate to impart a pressure to the outer surface of the honeycomb structure, and welding and fixing the to-be-jointed areas of the metallic plate 11c; and a clamshell method shown in FIG. 5, which comprises interposing a honeycomb structure between two metallic container parts 11a and 11b with a load being applied to the parts 11a and 11b, and welding the to-be-bonded areas (flanges) 16a and 16b of the parts 11a and 11b to obtain a honeycomb structure/metallic container integrated material. There is also suitably used a method (a swaging method) utilizing metal plastic processing, shown in FIG. 6, which comprises applying a compression force to a metallic container 11 from the outside via a tap (of pressure type) to squeeze the outer diameter of the metallic container 11. There can also be used a method shown in FIG. 7, which comprises squeezing, by plastic processing, the outer surface of a metallic container 11 using a processing jig 18 with the metallic container 11 being rotated, that is, a method which comprises squeezing the outer diameter of a metallic container by rotary forging and thereby imparting a pressure to the outer surface of a honeycomb structure accommodated in the metallic container.

When the honeycomb structure or honeycomb structure assembly of the present invention is used as a carrier for catalyst in an internal combustion engine, a boiler, a chemical reactor, a fuel cell reformer, or the like, the honeycomb segments used therein are allowed to load thereon a metal having a catalytic activity. As representative metals having a catalytic activity, there are mentioned Pt, Pd, Rh, etc. It is preferred that at least one kind of these is loaded on the honeycomb segments.

Meanwhile, when the honeycomb structure or honeycomb structure assembly of the present invention is used as a filter for trapping and removing the particulate substance contained in an exhaust gas, for example, as a diesel particulate filter (DPF), it is preferred that the cells of honeycomb structure are plugged alternately at each structure end and the cell walls of honeycomb structure are used as a filter.

When an exhaust gas containing a particulate substance is taken into a honeycomb structure constituted by honeycomb segments, from its one end, the exhaust gas enters the inside of the honeycomb structure from those holes not plugged at the one end, passes through porous cell walls having a filtration ability, and is discharged from the holes not plugged at the other end. The particulate substance is trapped by the cell walls at the time of its passing through the cell walls.

As the amount of particulate substance trapped and deposited on cell walls increases, a sudden increase in pressure loss takes place, a load to engine increases, and a reduction in fuel efficiency and drivability occurs; hence, the deposited particulate substance is burnt and removed periodically by a heating means such as heater or the like, to regenerate the ability of the filter. In order to promote the combustion during the regeneration, it is possible to load, on the honeycomb structure, the above-mentioned metal having a catalyst activity.

In the present invention, in order to load a catalyst on a honeycomb structure assembly 8, there can be used a method which comprises holding a honeycomb structure 1 in a metallic container 11 prior to catalyst loading, to form a honeycomb structure assembly 8, and then loading a catalyst on the honeycomb structure 1. According to this method, the risk of chipping-off or breakage of honeycomb structure during catalyst loading can be prevented. It is also preferred that when the honeycomb structure or honeycomb structure assembly of the present invention is used as a catalytic converter, a catalyst component is loaded on a honeycomb segment 2, then a honeycomb structure 1 is formed, and the structure is accommodated and held in a metallic container 11.

The present invention is described in more detail below by way of Examples. However, the present invention is not restricted to these Examples.

Incidentally, each of the following honeycomb structures of Examples and Conventional Examples (Comparative Examples) is a filter used for trapping diesel fine particles, which is made of silicon carbide and has a cell wall thickness of 0.38 mm and a cell density of 31 cells/cm$^2$ and wherein the passages are plugged alternately at each end of honeycomb structure and the cell walls function as a filter.

EXAMPLE 1

Figure 8A:
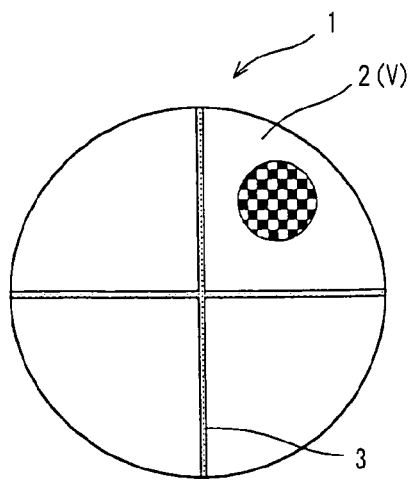
FIGS. 8(a), 8(b) and 8(c) are each a schematic top view of the honeycomb structure produced in an Example.

A silicon carbide powder was used as a raw material. Thereto were added methyl cellulose, hydroxypropoxyl methyl cellulose, a surfactant and water to prepare puddle (mud) having plasticity. This puddle (mud) was subjected to extrusion molding, and the resulting extrudate was dried using a microwave and hot air. Then, the holes of the dried extrudate were plugged alternately at each end of extrudate with a sealant made of the same material as for the honeycomb structure to be obtained, in such a way that each end of extrudate had a checkerboard pattern appearance. Then, the resulting material was heated for debindering in a $N_2$ atmosphere and fired in an Ar atmosphere to obtain honeycomb segments 2 (v) which were each ¼ of a column of about 144 mm in diameter and 152 mm in length and accordingly had a fan-shaped section. Four such honeycomb segments 2 (v) were bonded into one piece by providing a ceramic fiber-made non-intumescent mat 3 at all the gaps formed by each two close faces of adjacent honeycomb segments 2 (v) and using a double sided tape, to obtain a honeycomb structure shown in FIG. 8(a). Round the outer peripheral portion of the honeycomb structure was wound the same ceramic fiber-made non-intumescent mat as mentioned above; the mat-wound honeycomb structure was stuffed in a metallic (SUS 409) container using a tapered jig, to compression-fix the honeycomb structure and the metallic container, whereby a honeycomb structure assembly of 144 mm×152 mm was obtained.

EXAMPLE 2

Figure 8B:
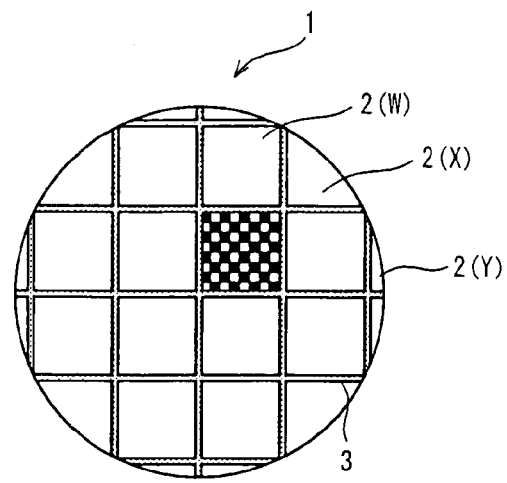

Honeycomb segments 2 (w), 2 (x) and 2 (y) were obtained in the same manner as in Example 1. Twelve rectangular parallelepiped honeycomb segments 2 (w) of 30 mm×30 mm×152 mm, four honeycomb segments 2 (x) and eight honeycomb segments 2 (y) (total twenty four honeycomb segments) were bonded into one piece by providing a ceramic fiber-made non-intumescent mat 3 at all the gaps formed by each two close faces of adjacent honeycomb segments and using a double-coated tape, to obtain a honeycomb structure shown in FIG. 8(b). Round the outer peripheral portion of the honeycomb structure was wound the same ceramic fiber-made non-intumescent mat as mentioned above; the mat-wound honeycomb structure was stuffed in a metallic (SUS 409) container using a tapered jig, to compression-fix the honeycomb structure and the metallic container, whereby a honeycomb structure assembly of 144 mm×152 mm was obtained.

EXAMPLE 3

Figure 8C:
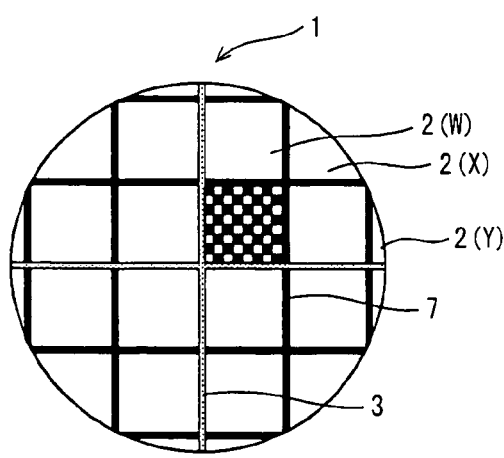

Three rectangular parallelepiped honeycomb segments of 30 mm×30 mm×152 mm obtained in the same manner as in Example 1, one honeycomb segment 2 (x) and two honeycomb segments 2 (y) (total six honeycomb segments) were bonded using an adhesive 7 which was a mixture of colloidal silica, an alumina fiber and water, followed by drying to prepare four honeycomb segments which were each ¼ of a column of about 144 mm in diameter and 152 mm in length and accordingly had a fan-shaped section. These four honeycomb segments were bonded into one piece by providing a ceramic fiber-made non-intumescent mat 3 at all the gaps formed by each two close faces of adjacent honeycomb segments and using a double-coated tape, to obtain a honeycomb structure shown in FIG. 8(c). Round the outer peripheral portion of the honeycomb structure was wound the same ceramic fiber-made non-intumescent mat as mentioned above; the mat-wound honeycomb structure was stuffed in a metallic (SUS 409) container using a tapered jig, to compression-fix the honeycomb structure and the metallic container, whereby a honeycomb structure assembly of 144 mm×152 mm was obtained.

The effects of the above Examples were evaluated in comparison with the following two conventional samples (Comparative Examples).

COMPARATIVE EXAMPLE 1

Figure 9A:
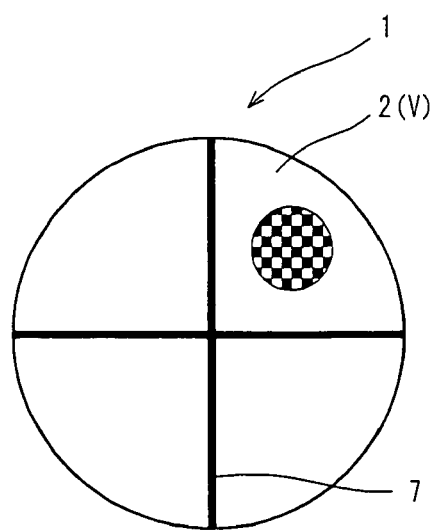
FIGS. 9(a) and 9(b) are each a schematic top view of the honeycomb structure produced in a Comparative Example.

Four honeycomb segments 2 (v) obtained in the same manner as in Example 1, which were each ¼ of a column of about 144 mm in diameter and 152 mm in length and accordingly had a fan-shaped section, were bonded into one piece using the above-mentioned adhesive 7 which was a mixture of colloidal silica, an alumina fiber and water, followed by drying to obtain a honeycomb structure of 144 mm (diameter)×152 mm, shown in FIG. 9(a). Round the outer peripheral portion of the honeycomb structure was wound a ceramic fiber-made non-intumescent mat; the mat-wound honeycomb structure was stuffed in a metallic (SUS 409) container using a tapered jig, to compression-fix the honeycomb structure and the metallic container, whereby a honeycomb structure assembly was obtained.

COMPARATIVE EXAMPLE 2

Figure 9B:
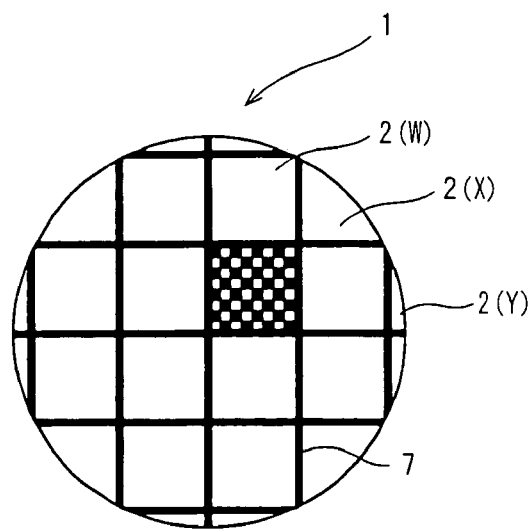

Twelve rectangular parallelepiped honeycomb segments 2 (w) of 30 mm×30 mm×152 mm obtained in the same manner as in Example 1, four honeycomb segments 2 (x) and eight honeycomb segments 2 (y) (total twenty four honeycomb segments) were bonded into one piece using the above-mentioned adhesive 7, followed by drying to obtain a honeycomb structure of 144 mm (diameter)×152 mm, shown in FIG. 9(b). Round the outer peripheral portion of the honeycomb structure was wound a ceramic fiber-made non-intumescent mat; the mat-wound honeycomb structure was stuffed in a metallic (SUS 409) container using a tapered jig, to compression-fix the honeycomb structure and the metallic container, whereby a honeycomb structure assembly was obtained.

The thus-obtained honeycomb structure assemblies of Examples 1 to 3 and Comparative Examples 1 to 2 were comparatively evaluated by a hot vibration test. The test conditions were as follows. The vibration acceleration was set at 30 G (30×9.8 m/sec$^2$); the vibration frequency was set at 100 Hz; heating was conducted for 10 minutes using an exhaust gas having an inlet temperature of 800° C. and a flow rate of 2.6 Nm$^3$/min.) and cooling was made for 10 minutes to 100° C. or less using air of ordinary temperature, and this heating and cooling cycle was continued until breakage of honeycomb structure took place or up to 200 hours.

The test results are shown in FIG. 10. In Comparative Examples 1 and 2 wherein all honeycomb segments were bonded physically using the above-mentioned adhesive, the bonded areas in the vicinity of the center of the honeycomb structure caused falling-off and breakage; meanwhile, in each of the honeycomb structure assemblies of Examples 1 to 3 according to the present invention, wherein a ceramic fiber-made non-intumescent mat was provided at all or at least part of the gaps formed by each two close faces of adjacent honeycomb segments, no change was seen after 200 hours and high durability and reliability were obtained.

As described above, the honeycomb structure and honeycomb structure assembly of the present invention used a material A having compressive elasticity, at gaps formed by each two close faces of adjacent honeycomb segments; therefore, they showed good durability and resistance to heat and vibration.

The invention claimed is:

1. A honeycomb structure obtained by bonding, into one piece, a plurality of honeycomb segments each having a plurality of passages surrounded by cell walls and extending in the axial direction of the segment, wherein a material A having compressive elasticity is provided at least at a portion of unbonded gaps formed by each two faces of adjacent honeycomb segments.

2. A honeycomb structure according to claim 1, wherein the material A having compressive elasticity is a ceramic fiber-made mat.

3. A honeycomb structure according to claim 2, wherein the ceramic fiber-made mat is a non-intumescent mat composed mainly of alumina or mullite.

4. A honeycomb structure according to claim 1, wherein the honeycomb structure is a filter that purifies exhaust gas of an automobile.

5. A honeycomb structure according to claim 1, wherein the honeycomb structure is a filter that traps diesel fine particles.

6. A honeycomb structure according to claim 1, wherein the main component of each honeycomb segment comprises (1) at least one kind of ceramic selected from the group consisting of silicon carbide, silicon nitride, cordierite, alumina, mullite, zirconia, zirconium phosphate, aluminum titanate, titania and combinations thereof, and (2) Fe—Cr—Al, nickel or metallic Si and SiC.

7. A honeycomb structure according to claim 2, wherein the main component of each honeycomb segment comprises (1) at least one kind of ceramic selected from the group consisting of silicon carbide, silicon nitride, cordierite, alumina, mullite, zirconia, zirconium phosphate, aluminum titanate, titania and combinations thereof, and (2) Fe—Cr—Al, nickel or metallic Si and SiC.

8. A honeycomb structure according to claim 3, wherein the main component of each honeycomb segment comprises (1) at least one kind of ceramic selected from the group consisting of silicon carbide, silicon nitride, cordierite, alumina, mullite, zirconia, zirconium phosphate, aluminum titanate, titania and combinations thereof, and (2) Fe—Cr—Al, nickel or metallic Si and SiC.

9. A honeycomb structure assembly comprising
a metallic container,
a honeycomb structure obtained by bonding, into one piece, a plurality of honeycomb segments each having a plurality of passages surrounded by cell walls and extending in the axial direction of the segment, wherein a material A having compressive elasticity is provided at least at a portion of unbonded gaps formed by each two faces of adjacent honeycomb segments, and
a material B having compressive elasticity,
in which honeycomb structure assembly the material B having compressive elasticity is provided on the outer peripheral portion of the honeycomb structure in a compressed state and thereby the honeycomb structure is compression-held in the metallic container.

10. A honeycomb structure assembly according to claim 9, wherein the material B having compressive elasticity is a ceramic fiber-made mat.

11. A honeycomb structure assembly according to claim 10, wherein the ceramic fiber-made mat is a non-intumescent mat composed mainly of alumina or mullite.

12. A honeycomb structure assembly according to claim 10, wherein the ceramic fiber-made mat is a heat-intumescent mat containing vermiculite.

13. A honeycomb structure assembly according to claim 9, the honeycomb structure assembly is a stuffed can structure, a tourniquet can structure, a clamshell can structure or a swaging can structure.

14. A honeycomb structure assembly according to claim 9, wherein the honeycomb structure assembly includes catalyst-loaded honeycomb segments accommodated in the metallic container.

15. A honeycomb structure assembly according to claim 13, wherein the honeycomb structure assembly includes catalyst-loaded honeycomb segments accommodated in the metallic container.

16. A honeycomb structure assembly according to claim 9, wherein the honeycomb structure assembly comprises the honeycomb segments accommodated in the metallic container, the interior of the metallic container and the honeycomb segments being loaded with catalyst.

17. A honeycomb structure assembly according to claim 13, wherein the honeycomb structure assembly comprises honeycomb segments accommodated in the metallic container, the interior of the metallic container and the honeycomb segments being loaded with catalyst.

* * * * *